United States Patent
Deng

(10) Patent No.: US 11,972,580 B2
(45) Date of Patent: Apr. 30, 2024

(54) VIDEO STITCHING METHOD AND APPARATUS, ELECTRONIC DEVICE, AND COMPUTER STORAGE MEDIUM

(71) Applicant: Tencent Technology (Shenzhen) Company Limited, Guangdong (CN)

(72) Inventor: Shuo Deng, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 566 days.

(21) Appl. No.: 17/184,258

(22) Filed: Feb. 24, 2021

(65) Prior Publication Data

US 2021/0183013 A1 Jun. 17, 2021

Related U.S. Application Data

(63) Continuation of application No. PCT/CN2019/119616, filed on Nov. 20, 2019.

(30) Foreign Application Priority Data

Dec. 7, 2018 (CN) .......................... 201811496469.3

(51) Int. Cl.
*G06K 9/00* (2022.01)
*G06F 18/22* (2023.01)
(Continued)

(52) U.S. Cl.
CPC ................ *G06T 7/30* (2017.01); *G06F 18/22* (2023.01); *G06T 3/4038* (2013.01); *G06T 7/248* (2017.01);
(Continued)

(58) Field of Classification Search
CPC ....... G06F 18/22; G06T 3/4038; G06T 7/248; G06T 7/70
See application file for complete search history.

(56) References Cited

U.S. PATENT DOCUMENTS 9,215,459 B2 * 12/2015 Nakashima .......... H04N 19/521
9,635,307 B1 * 4/2017 Mysore Vijaya Kumar ................
G06T 7/90

(Continued)

FOREIGN PATENT DOCUMENTS

CN 101304490 A * 11/2008
CN 101304490 A 11/2008
(Continued)

OTHER PUBLICATIONS

A Fast Video Stitching Method for Motion-Compensated Frames in Compressed Video Streams, Tomoyuki Shimizu et al., IEEE, 2006, pp. 173-174 (Year: 2006).*

(Continued)

*Primary Examiner* — Jayesh A Patel
(74) *Attorney, Agent, or Firm* — Crowell & Moring LLP

(57) ABSTRACT

This application relates to the field of video processing, and discloses a video stitching method and apparatus, an electronic device, and a non-transitory computer-readable storage medium, where the video stitching method includes: detecting a similarity between a first image and a second image, the first image being an image frame of a first to-be-stitched video, and the second image being an image frame of a second to-be-stitched video; then determining a motion vector of the first image relative to the second image when the similarity meets a preset condition; and then determining at least one compensated frame between the first image and the second image according to the motion vector, and stitching the first image and the second image based on the at least one compensated frame to stitch the first to-be-stitched video and the second to-be-stitched video.

20 Claims, 6 Drawing Sheets

(51) Int. Cl.
G06T 3/4038 (2024.01)
G06T 7/246 (2017.01)
G06T 7/30 (2017.01)
G06T 7/70 (2017.01)
G06V 10/50 (2022.01)
G06V 10/74 (2022.01)

(52) U.S. Cl.
CPC ............... G06T 7/70 (2017.01); G06V 10/50 (2022.01); G06V 10/761 (2022.01)

(56) References Cited

U.S. PATENT DOCUMENTS

| | | | |
|---|---|---|---|
| 10,600,157 B2* | 3/2020 | Shoa Hassani Lashdan | ............... H04N 5/2621 |
| 11,153,465 B2* | 10/2021 | Tran | .......... G01S 3/00 |
| 2003/0035592 A1 | 2/2003 | Cornog et al. | |
| 2003/0123726 A1* | 7/2003 | Suh | ......... G11B 27/28 348/E5.067 |
| 2005/0008240 A1* | 1/2005 | Banerji | ............... H04N 19/895 375/E7.262 |
| 2010/0074340 A1* | 3/2010 | Luo | ................. H04N 21/44004 375/E7.027 |
| 2013/0290514 A1 | 10/2013 | McGowan et al. | |
| 2014/0376882 A1* | 12/2014 | Xiong | ................... H04N 17/04 386/239 |
| 2015/0155009 A1 | 6/2015 | Mate et al. | |
| 2016/0080687 A1* | 3/2016 | Matsui | ................... H04N 5/765 386/353 |
| 2016/0217338 A1 | 7/2016 | Li | |
| 2018/0012078 A1* | 1/2018 | Pournaghi | ................. G06T 7/77 |
| 2018/0121069 A1* | 5/2018 | DiVerdi | .................. G06T 11/60 |
| 2018/0218484 A1* | 8/2018 | Shen | ..................... G06T 3/4007 |
| 2018/0376035 A1* | 12/2018 | Tran | ...................... H04N 5/145 |

FOREIGN PATENT DOCUMENTS

| | | | | |
|---|---|---|---|---|
| CN | 101606389 A | | 12/2009 | |
| CN | 102157009 A | | 8/2011 | |
| CN | 103501415 A | | 1/2014 | |
| CN | 104240224 A | | 12/2014 | |
| CN | 104396269 A | | 3/2015 | |
| CN | 106331480 A | | 1/2017 | |
| CN | 106331480 A | * | 1/2017 | ......... H04N 5/23251 |
| CN | 106657816 A | | 5/2017 | |
| CN | 107958442 A | | 4/2018 | |
| WO | WO 2012/088629 A1 | | 7/2012 | |
| WO | WO-2012088629 A1 | * | 7/2012 | ............. G06T 13/40 |
| WO | WO-2012101542 A1 | * | 8/2012 | ......... A63B 24/0003 |
| WO | WO 2016180486 A1 | | 11/2016 | |

OTHER PUBLICATIONS

Stitching Videos Streamed by Mobile Phones in Real-time, Motaz El-Saban et al., ACM, 2009, pp. 1009-1010 (Year: 2009).*
Fast Stitching of Videos Captured From Freely Moving Devices by Exploiting Temporal Redundancy, Motaz El-Saban et al., IEEE, 2010, pp. 1193-1196 (Year: 2010).*
Panoramic Video from Unstructured Camera Arrays, F. Perazzi et al., Eurographics, 2015, pp. 57-68 (Year: 2015).*
An Effective Video Stitching Method, Linqiang Chen et al., IEEE, 2010, pp. VI-297-VI-301 (Year: 2010).*
Content-Preserving Video Stitching Method for Multi-Camera Systems, Bo-Sang Kim et al., IEEE, 2017, pp. 109-116 (Year: 2017).*
International Search Report with English Translation and Written Opinion for priority international application No. PCT/CN2019/119616, dated Feb. 19, 2020, 12p.
First Office Action and Search Report for Chinese application No. 2018114964693, dated Mar. 3, 2021, 10p, in Chinese language.
Concise Explanation of Relevance for ref. B11, 1p.
Extended European Search Report for 19892144.7 dated Jan. 4, 2022, 8p.

* cited by examiner

VIDEO STITCHING METHOD AND APPARATUS, ELECTRONIC DEVICE, AND COMPUTER STORAGE MEDIUM

RELATED APPLICATION

This application is a continuation of and claim priority to the PCT International Patent Application No. PCT/CN2019/119616, entitled "VIDEO STITCHING METHOD AND APPARATUS, ELECTRONIC DEVICE, AND COMPUTER STORAGE MEDIUM" and filed with the National Intellectual Property Administration, PRC on Nov. 20, 2019, which claims priority to Chinese Patent Application No. 201811496469.3, entitled "VIDEO STITCHING METHOD AND APPARATUS, ELECTRONIC DEVICE, AND COMPUTER STORAGE MEDIUM" and filed with the National Intellectual Property Administration, PRC on Dec. 7, 2018. The above applications are incorporated by reference in their entireties.

FIELD OF THE TECHNOLOGY

This disclosure relates to the field of video processing technologies, and specifically, to a video stitching method and apparatus, an electronic device, and a computer storage medium.

BACKGROUND

With the reduction of network traffic costs, costs of posting a captured video by a user are also reduced. Therefore, many users upload captured videos to corresponding video platforms. If the user performs non-linear video capturing, that is, a plurality of video clips with similar scenes are captured at the same place but different time points, after the capturing is completed, the plurality of video clips with similar scenes captured at different time points are usually stitched before being uploaded to a corresponding video platform, and then a stitched video is uploaded to the corresponding video platform.

However, when stitching two video clips with similar scenes, the location of an intelligent terminal used by a photographer may slightly change, causing a jitter at a connection part of two videos, which greatly degrades user viewing experience.

SUMMARY

This disclosure provides a video stitching method and apparatus, an electronic device, and a non-transitory computer storage medium.

According to one aspect, a video stitching method is provided, including:
  detecting a similarity between a first image and a second image, the first image being a last image frame of a first to-be-stitched video, and the second image being a first image frame of a second to-be-stitched video;
  determining a motion vector of the first image relative to the second image when the similarity meets a preset condition; and
  determining at least one compensated frame between the first image and the second image according to the motion vector, and stitching the first image and the second image based on the at least one compensated frame to stitch the first to-be-stitched video and the second to-be-stitched video.

According to another aspect, a video stitching apparatus is provided. The apparatus includes:
  a detection module, configured to detect a similarity between a first image and a second image, the first image being a last image frame of a first to-be-stitched video, and the second image being a first image frame of a second to-be-stitched video;
  a determining module, configured to determine a motion vector of the first image relative to the second image when the similarity meets a preset condition; and
  a stitching module, configured to determine at least one compensated frame between the first image and the second image according to the motion vector, and stitch the first image and the second image based on the at least one compensated frame to stitch the first to-be-stitched video and the second to-be-stitched video.

According to another aspect, an electronic device is provided, which includes a memory, a processor, and a computer program stored on the memory and executable on the processor, the processor, when executing the program, implementing the foregoing video stitching method.

According to another aspect, a non-transitory computer-readable storage medium is provided, the computer-readable storage medium storing a computer program, the program, when executed by a processor, implementing the foregoing video stitching method.

Additional aspects and advantages of this disclosure will be given in part in the following description, and will become apparent from the following description or may be learned from practices of this disclosure.

BRIEF DESCRIPTION OF THE DRAWINGS

The foregoing and/or additional aspects and advantages of this disclosure will become obvious and easy to understand from the following descriptions of the embodiments with reference to the accompanying drawings.

DETAILED DESCRIPTION

Figure 1A:
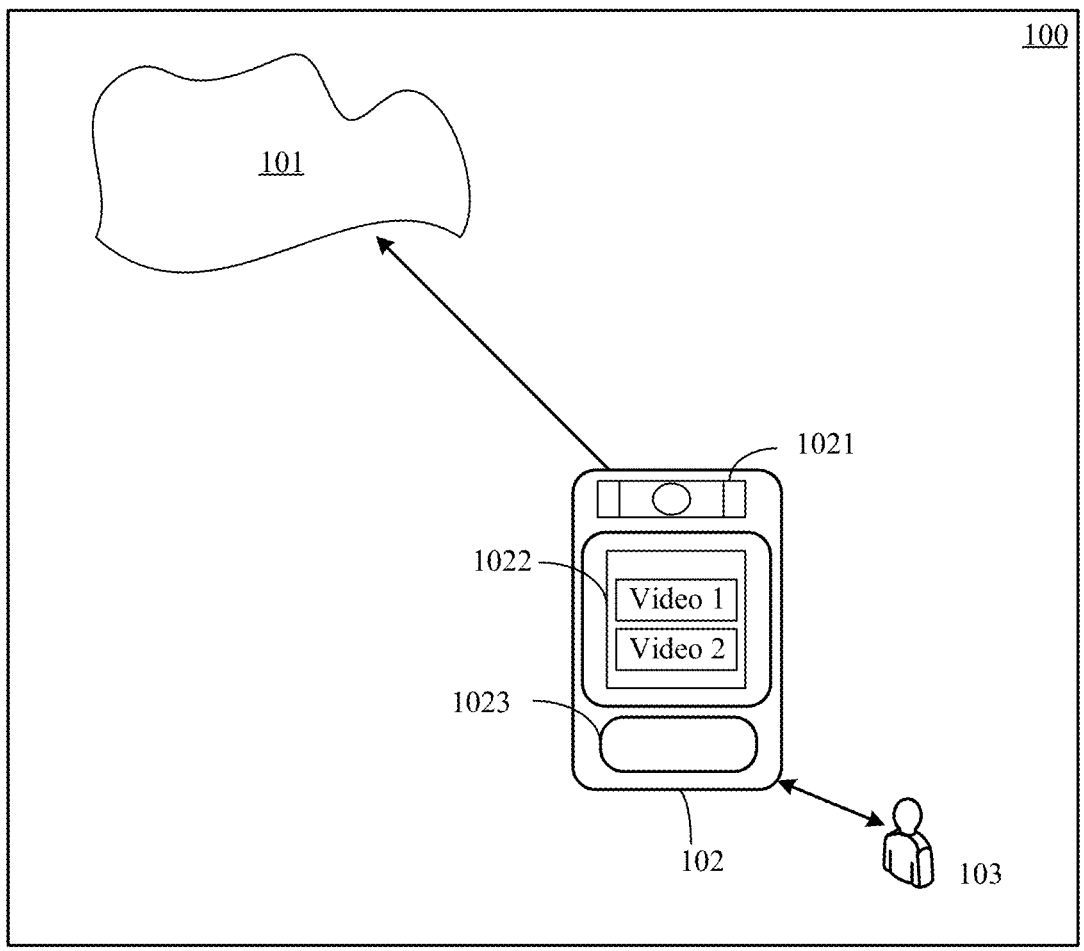
FIG. 1a is a diagram of an application scenario of a video stitching system according to an embodiment of this disclosure.

The following describes embodiments of this disclosure in detail. Examples of the embodiments are shown in the accompanying drawings, and same or similar reference signs in all the accompanying drawings indicate same or similar components or components having same or similar functions. The embodiments that are described below with reference to the accompany drawings are exemplary, and are only used to interpret this disclosure and cannot be construed as a limitation to this disclosure.

A person skilled in the art may understand that, the singular forms "a", "an", "said", and "the" used herein may include the plural forms as well, unless the context clearly indicates otherwise. It is to be further understood that, the terms "include" and/or "comprise" used in this specification of this disclosure refer to the presence of stated features, integers, steps, operations, elements, and/or components, but do not preclude the presence or addition of one or more other features, integers, steps, operations, elements, components, and/or combinations thereof. It is to be understood that, when an element is "connected" or "coupled" to another element, the element may be directly connected to or coupled to another element, or an intermediate element may exist. In addition, the "connection" or "coupling" used herein may include a wireless connection or a wireless coupling. The term "and/or" used herein includes all of or any of and all combinations of one or more related listed items.

To make objectives, technical solutions, and advantages of this disclosure clearer, the following further describes implementations of this disclosure in detail with reference to the accompanying drawings.

The following describes the technical solutions of this disclosure and how to resolve the foregoing technical issues according to the technical solutions of this disclosure in detail by using specific embodiments. The following several specific embodiments may be combined with each other, and the same or similar concepts or processes may not be described repeatedly in some embodiments. The following describes the embodiments of this disclosure with reference to the accompanying drawings.

Ordinary video stitching is usually implemented based on a video frame interpolation method, for example, a video of 60 frames per second (fps) is generated by performing a compensated frame interpolation on a video of 30 fps, and the video frame interpolation is mainly used for a frame interpolation in content of a single video. However, for non-linear video capturing, when two videos are stitched, a frame interpolation condition cannot be completely met due to uncertainty in a relationship between previous and subsequent video frames.

In addition, the ordinary video frame interpolation method usually has a relatively large computation amount and costs a relatively long running time, and a use scenario thereof is more intended for conventional video post-processing. If the method is applied to a mobile device, hardware in the mobile device needs to be capable of supporting the function. However, currently, only an extremely small quantity of hardware manufactures support the function, and an algorithm is relatively fixed, leading to a relatively large quantity of limitations on mobile devices and use scenarios. Further, even if the ordinary video frame interpolation method is applied to a mobile device, it is difficult to process in real time due to a limited computation capability of the mobile device, causing cases, for example, real-time performance is relatively poor and a user needs to wait.

FIG. 1a is a diagram of an disclosure scenario of a video stitching system according to an embodiment of this disclosure. As shown in FIG. 1a, a video stitching system 100 operated by a user 103 includes a target object 101 and an electronic device 102. The user 103 captures, at a particular place, the target object 101 by using a camera device 1021 disposed on the electronic device 102 to obtain a plurality of video clips. Then, a video stitching apparatus 1022 on the electronic device 102 is started to stitch the plurality of video clips. For example, each two adjacent to-be-stitched videos "video 1" and "video 2" are stitched by using the method described in this embodiment of this disclosure, so that a continuous video file is obtained based on the plurality of captured video clips. Then, the user may start a video application 1023 on the electronic device 102, and upload a stitched video file to a video platform for sharing.

Figure 1B:
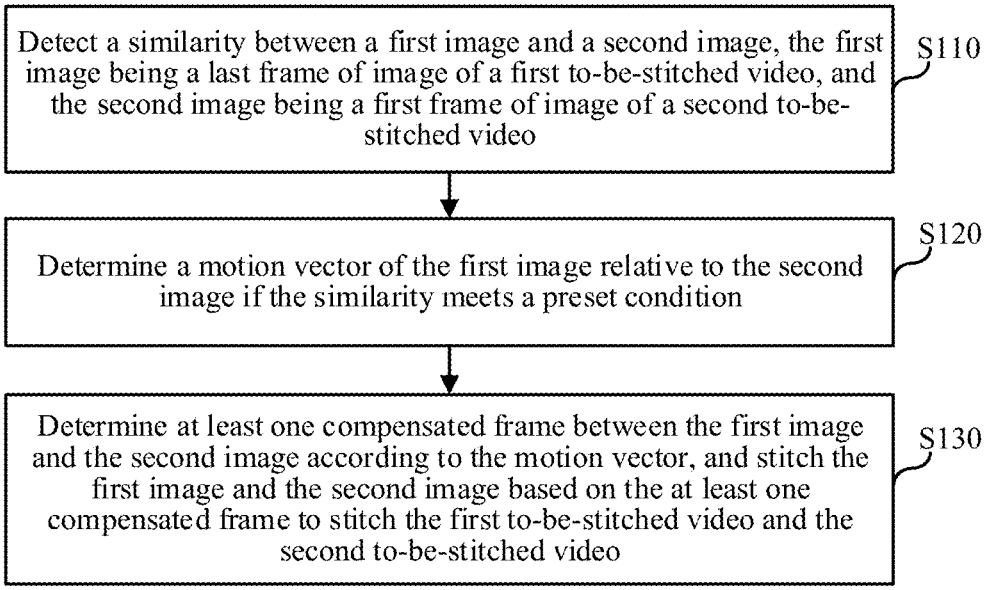
FIG. 1b is a schematic flowchart of a video stitching method according to an embodiment of this disclosure.

As shown in FIG. 1b, a video stitching method is provided in an embodiment of this disclosure and may be implemented by an electronic device. The electronic device may be the electronic device 102 shown in FIG. 1a. The method includes the following steps:

Step S110. Detect a similarity between a first image and a second image, the first image being a last image frame of a first to-be-stitched video, and the second image being a first image frame of a second to-be-stitched video.

Figure 2:
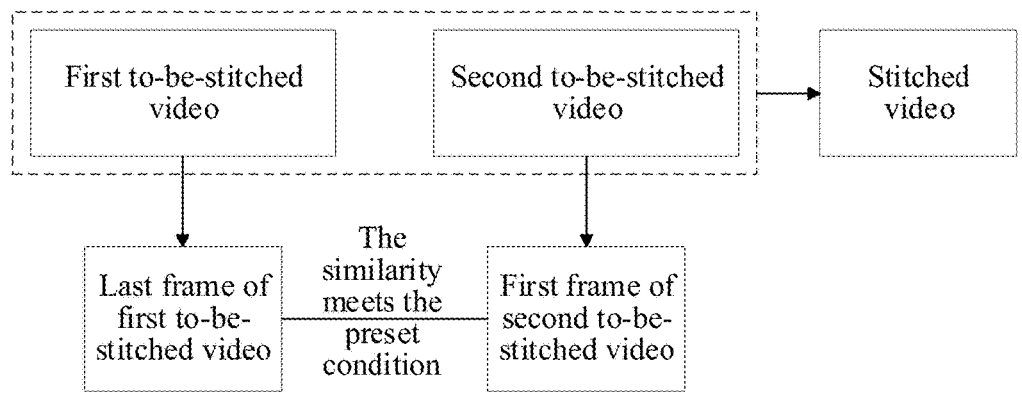
FIG. 2 is a schematic diagram of video stitching according to an embodiment of this disclosure.

Specifically, the video stitching method in this embodiment of this disclosure is mainly applicable to a case that previous and subsequent frames of a to-be-stitched video clip are similar (for example, meets a preset similarity condition). FIG. 2 is a schematic diagram of video stitching according to an embodiment of this disclosure. If a difference between the previous and subsequent frames is excessively large, subsequent motion vector estimation and compensated frame interpolation cannot be implemented. Therefore, at a preprocessing stage, similarity evaluation needs to be performed for the previous and subsequent frames, to ensure a running significance of a stitching algorithm.

Further, in a specific application, a similarity evaluation method may be used for performing similarity evaluation on the previous and subsequent frames, for example, detecting whether a similarity between the last image frame of the first to-be-stitched video and the first image frame of the second to-be-stitched video meets a preset condition. If the preset condition is met, subsequent steps (that is, step S120 and step S130) of the video stitching method implemented in this application may continue to be performed for smoothly stitching a plurality of videos. In other words, when a user needs to stitch a video A and a video B, if an end frame of the video A and a first frame of the video B are strongly correlated, the method implemented in this application may be used for an anti jitter compensated frame interpolation, so that a smooth transition between the video A and the video B may be implemented, and a use scenario that does not meet a stitching condition is effectively filtered.

Step S120. Determine a motion vector of the first image relative to the second image when the similarity meets the preset condition.

Specifically, when the similarity between the first image and the second image meets the preset similarity condition, the motion vector of the first image relative to the second image is determined, that is, a motion trajectory, for example, a motion distance and a motion direction, between the first image and the second image is estimated, so that a necessary foundation is laid for subsequent smooth stitching for the first to-be-stitched video and the second to-be-stitched video.

Step S130. Determine at least one compensated frame between the first image and the second image according to the motion vector, and stitch the first image and the second image based on the at least one compensated frame to stitch the first to-be-stitched video and the second to-be-stitched video.

Specifically, after the motion vector of the first image relative to the second image is determined, the at least one compensated frame between the first image and the second image may be determined according to the determined motion vector, and evolutionary compensation is performed on the first image according to the at least one compensated frame, so that the first image can be slowly and smoothly transitioned to the second image, and the stitching between the first image and the second image is implemented, thereby stitching the first to-be-stitched video and the second to-be-stitched video.

The video stitching method provided in this embodiment of this disclosure provides a method for stitching non-linearly captured video clips on a mobile device. When the first image and the second image meet a pre-set condition, this embodiment determines a motion vector of the first image relative to the second image, determines at least one compensated frame between the first image and the second image according to the motion vector, and stitches the first image and the second image based on the at least one compensated frame. By means of the method, a plurality of videos can be efficiently stitched on the mobile device in real time, and smooth compensation of high quality is performed on a jitter at a connection part of the videos, so that a smooth transition may be achieved between the plurality of videos. Cases such as an image jitter or image jump after the plurality of videos are stitched are effectively reduced, thereby a user' experience in video stitching, publishing, and viewing are improved. Besides, the method can be applicable to a terminal device with an operating system such as Android or IOS without a support of specific hardware in the terminal device, thereby avoiding a dependence on hardware manufacturers and resolving the problem of a limitation on mobile devices and use scenarios in an ordinary video frame interpolation method.

Another possible implementation is provided in this embodiment of this disclosure, where the similarity meeting a preset condition includes: the similarity is not less than a preset similarity threshold.

The step of detecting the similarity between the first image and the second image, includes:
  determining a first grayscale histogram of the first image and a second grayscale histogram of the second image;
  determining a weight of each grayscale in the first grayscale histogram; and
  determining the similarity between the first image and the second image according to the determined weights, a quantity of pixels corresponding to each grayscale in the first grayscale histogram, and a quantity of pixels corresponding to each grayscale in the second grayscale histogram.

Specifically, assuming that the first to-be-stitched video is a video A, that the end image frame of the first to-be-stitched video is $I_a$, that the second to-be-stitched video is a video B, and that the first image frame of the second to-be-stitched video is $I_b$, when determining whether the similarity between the first image and the second image meets the preset condition, the result may be determined by determining the similarity between $I_a$ and $I_b$ and detecting whether the similarity is not less than (that is, greater than or equal to) the preset similarity threshold. If the similarity between $I_a$ and $I_b$ is not less than the preset similarity threshold, it is determined that the similarity between $I_a$ and $I_b$ meets the preset condition, and another subsequent operational step may continue to be performed; otherwise, the similarity does not meet the preset condition, and another subsequent operational step cannot be performed.

Further, the similarity between $I_a$ and $I_b$ may be determined according to grayscale histograms $H_a$ (that is, the foregoing first grayscale histogram) and $H_b$ (that is, the foregoing second grayscale histogram), which are respectively corresponding to $I_a$ and $I_b$. The similarity between $I_a$ and $I_b$ may be determined according to a weight of each grayscale in the grayscale histogram $H_a$ of $I_a$, a quantity of pixels corresponding to the each grayscale in $H_a$, and a quantity of pixels corresponding to each grayscale in $H_b$.

The description of determining the similarity between the first image and the second image is made below by using a specific example.

Step 1. Determine the grayscale histogram $H_a$ of $I_a$ and the grayscale histogram $H_b$ of $I_b$.

Specifically, distribution ranges of the grayscales of $H_a$ and $H_b$ are both [0, 255], which means that the brightness is from dark to light, and a corresponding color in an image is from black to white, namely, white being 255 and black being 0. A grayscale histogram is used for counting occurrence frequencies of all pixels in a digital image according to magnitudes of grayscale values. The grayscale histogram is a function of the grayscale, which represents a quantity of a pixel having a certain grayscale in the image and reflects an occurrence frequency of a certain grayscale in the image.

Step 2. Calculate the weight (recorded as $\varepsilon_i$, a value range of i is 0 to 255) of the each grayscale in $H_a$.

Specifically, for the each grayscale, a ratio of the quantity of pixels corresponding to the each grayscale to a total quantity of pixels is used as the weight of the each grayscale. For example, the weight $\varepsilon_i$ of the each grayscale in $H_a$ may be calculated by using the following formula:

$$\varepsilon_i = H_a^i \bigg/ \sum_{i=0}^{255} H_a^i \qquad (1)$$

where $H_a^i$ in the foregoing formula represents a quantity of pixels having a grayscale value i in $I_a$, and $$\sum_{i=0}^{255} H_a^i$$

represents a total quantity of pixels of grayscale values in $I_a$.

Further, similarity degrees between grayscale histograms are used for evaluating a similarity degree between $I_a$ and $I_b$ in this embodiment of this disclosure. In this embodiment, $I_a$ is used as a reference image. An area with more grayscales distributed represents that main information of the image is distributed in the area in a more centralized manner. A weight of each grayscale range is determined by using the information in this embodiment, thereby ensuring the stability of the video stitching method.

Step 3. Evaluate the similarity between $I_a$ and $I_b$, the similarity being recorded as S.

Specifically, the similarity between $I_a$ and $I_b$ may be calculated by using the following formula:

$$S = 1 - \sum_{i=0}^{i=255} \varepsilon_i * \frac{|H_a^i - H_b^i|}{H_a^i} \quad (2)$$

where the foregoing formula is a normalized similarity calculation formula, $S \in [0,1]$, $H_b^i$ in the foregoing formula represents a quantity of pixels having the grayscale value i in $I_b$, and a larger value of S represents a higher similarity degree.

Further, the calculated similarity value S and the preset similarity threshold (for example, 0.87) may be compared. If S is not less than the preset similarity threshold, it is determined that the similarity between $I_a$ and $I_b$ meets the preset similarity condition.

In this implementation, by evaluating the similarity between the previous and subsequent frames, the running significance of the stitching algorithm is ensured, and a stitching scenario that does not meet a use condition is effectively filtered.

Another possible implementation is provided in this embodiment of this disclosure. Step S120 (determine a motion vector of the first image relative to the second image) specifically includes:

performing a transverse deformation and a vertical deformation on the first image and the second image based on preset deformation ratios to obtain a first transversely deformed image and a first vertically deformed image of the first image, and a second transversely deformed image and a second vertically deformed image of the second image;

determining a first motion distance of the first image in a horizontal direction according to a horizontal movement distance of the first transversely deformed image relative to the second transversely deformed image;

determining a second motion distance of the first image in a vertical direction according to a vertical movement distance of the first vertically deformed image relative to the second vertically deformed image; and determining the motion vector according to the first motion distance, the second motion distance, and the preset deformation ratios.

Specifically, in this embodiment of this disclosure, it is assumed that the second image is fixed, and only the first image is moved. That is, the second image is obtained by moving the first image. Therefore, the motion vector of the first image needs to be calculated.

Further, before calculating the motion vector of the first image, the transverse deformation and the vertical deformation need to be first performed on the first image and the second image according to the preset deformation ratios. The preset deformation ratios include a transverse deformation ratio and a vertical deformation ratio, the transverse deformation ratio being the same or different from the vertical deformation ratio.

In this embodiment of this disclosure, the deformation specifically refers to stretching or shortening an image in a transverse direction or a vertical direction according to a certain ratio. A specific value of the preset deformation ratio directly affects estimation precise of the motion vector. In an actual application, if the transverse deformation ratio is 1, a transverse width remains in an original width. If a vertical height is changed to a height of 10, the vertical deformation ratio $r_v^y = 10/\text{original height}$. An original width and an original height of an image are attributes of the image. That is, when an image frame is given, an original width and an original height thereof can be learned.

Further, the first transversely deformed image and the second transversely deformed image may be correspondingly obtained by performing the transverse deformation on the first image and the second image separately according to the transverse deformation ratio. Because the first image and the second image are images in videos that have the same background and that are captured by using the same terminal device, an original transverse height of the first image is the same as an original transverse height of the second image, and an original vertical height of the first image is the same as an original vertical height of the second image. Therefore, a width of the first transversely deformed image is the same as a width of the second transversely deformed image, and a height of the first transversely deformed image is the same as a height of the second transversely deformed image.

Figure 3A:
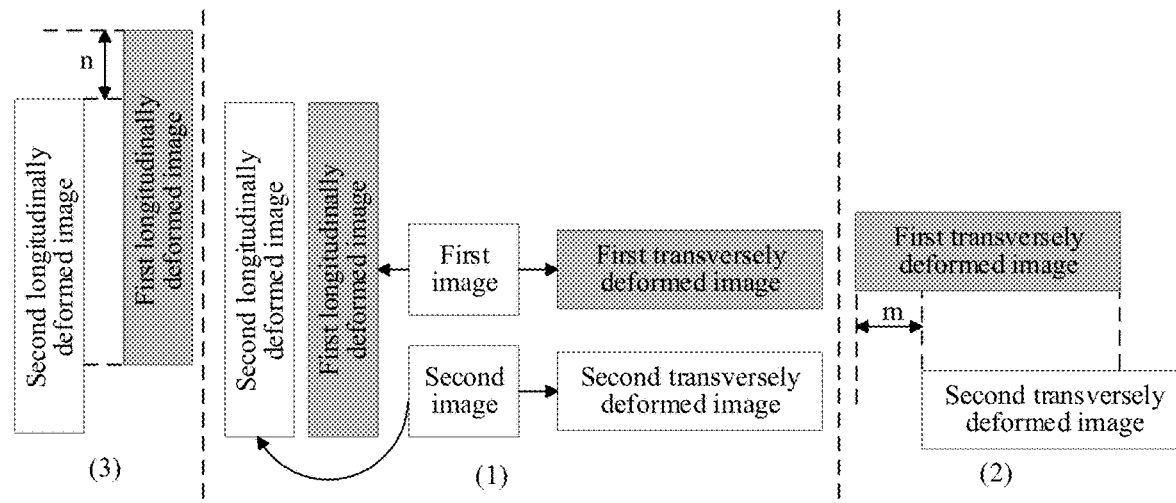
FIG. 3a is a schematic diagram of an image deformation and motion process according to an embodiment of this disclosure.

Further, to facilitate a subsequent calculation of a movement distance of the first transversely deformed image in a horizontal direction, as shown in part (1) in FIG. 3a, the obtained first transversely deformed image and the obtained second transversely deformed image may be set as parallel in the horizontal direction and aligned at two ends, and positions of the first transversely deformed image and the second transversely deformed image in part (1) are initial positions thereof.

Further, a first vertically deformed image and a second vertically deformed image may be correspondingly obtained by performing the vertical deformation on the first image and the second image separately according to the vertical deformation ratio. Because the first image and the second image are images in videos that have the same background and that are captured by using the same terminal device, the original transverse height of the first image is the same as the original transverse height of the second image, and an original vertical height of the first image is the same as an original vertical height of the second image. Therefore, a width of the first vertically deformed image is the same as a width of the second vertically deformed image, and a height of the first vertically deformed image is the same as a height of the second vertically deformed image.

Further, to facilitate a subsequent calculation of a movement distance of the first vertically deformed image relative to the second vertically deformed image in a vertical direction, as shown in part (1) in FIG. 3a, the obtained first vertically deformed image and the obtained second vertically deformed image may be set as parallel in the vertical direction and aligned at two ends.

Further, in a process of determining a first motion distance of the first image in a horizontal direction according to a horizontal movement distance of the first transversely deformed image relative to the second transversely deformed image, the first transversely deformed image may be moved in sequence in the horizontal direction, and after each movement, two sub-images respectively corresponding to the first transversely deformed image after the each movement and the second transversely deformed image in a vertical direction are determined. A first difference value between the two sub-images is calculated, and a total quantity of moved pixels of the first transversely deformed image after the each movement, that is, the total quantity of pixels of the first transversely deformed image that have been moved relative to the initial position, is determined.

If X pixels in total are moved, and X is a positive integer, X is a total quantity of moved pixels of the first transversely deformed image when there are no corresponding parts in a vertical direction between the first transversely deformed image after a movement in the horizontal direction and the second transversely deformed image.

The movement in the horizontal direction may be a movement to the left in the horizontal direction, for example, a movement shown in part (2) in FIG. 3a, or may be a movement to the right in the horizontal direction, and this is not limited in this embodiment of this disclosure. The movement in the horizontal direction is described as follows by using a movement to the left in the horizontal direction as an example.

In one case, if the first transversely deformed image is moved left in sequence in the horizontal direction, and m pixels are moved each time, 1≤m≤X. That is, m pixels are moved left each time (for example, one pixel is moved for the first time, and a second movement is to move another one pixel based on the first movement, and a third movement is to move another one pixel based on the second movement), and a sum of pixels moved in all movements is X, each time the first transversely deformed image is moved, a difference value, that is, the first difference value between the two sub-images respectively corresponding to the first transversely deformed image after the movement and the second transversely deformed image in the vertical direction, is calculated.

Figure 3B:
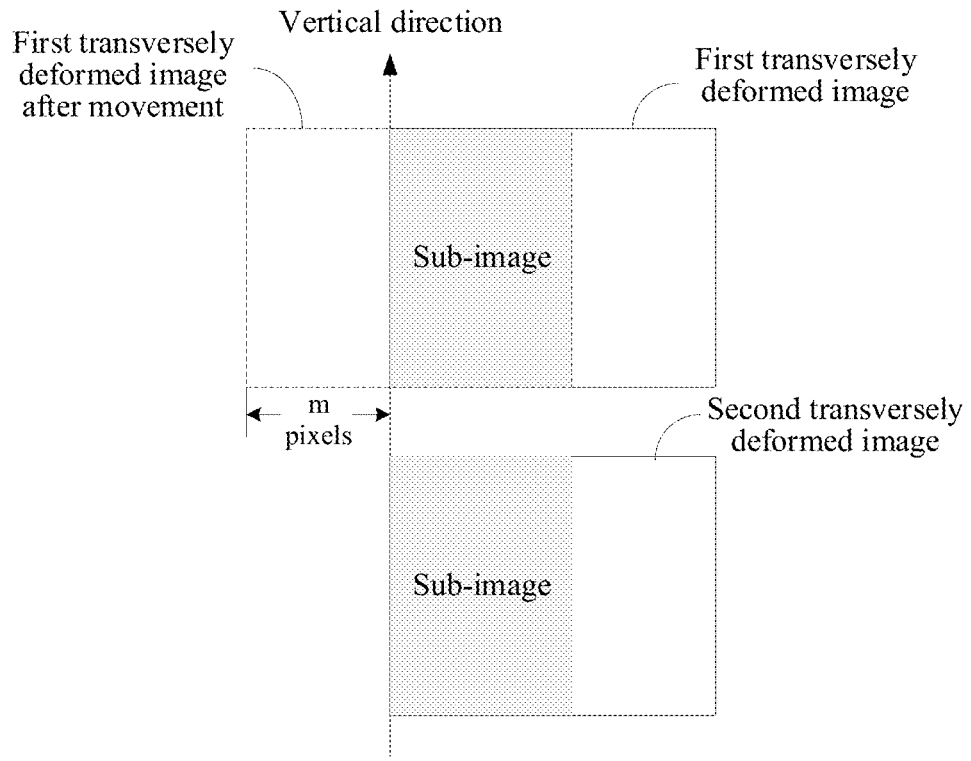
FIG. 3b is a schematic diagram of calculating a first difference value according to an embodiment of this disclosure.

As shown in FIG. 3b, after the first transversely deformed image and the second transversely deformed image are parallel in the horizontal direction and aligned at two ends, the first transversely deformed image is moved left by m pixels to obtain the first transversely deformed image after the movement shown by dashed lines. After the first transversely deformed image after the movement and the second transversely deformed image are aligned in the vertical direction, two sub-images corresponding to each other (that is, two sub-images that can overlap each other) are obtained.

If L movements in total are performed, L difference values in total are calculated, and a difference value calculated each time is the same or different. In addition, all the difference values involved in this paragraph refer to the first difference value.

In another case, if the first transversely deformed image is moved left in sequence in the horizontal direction, and a quantity of pixels moved each time is changed (for example, one pixel is moved for the first time, and a second movement is to move another two pixels based on the first movement, and a third movement is to move another four pixels based on the second movement), that is, the quantity of pixels moved each time is dynamically changed, and a sum of pixels moved in all movements is X, each time the first transversely deformed image is moved, a difference value, that is, a difference value between the two sub-images respectively corresponding to the first transversely deformed image after the movement and the second transversely deformed image in the vertical direction, is calculated. If Q movements in total are performed, Q difference values in total are calculated, and a difference value calculated each time is the same or different. In addition, the difference values involved in this paragraph refer to the first difference value.

Further, after a plurality of first difference values between corresponding parts of the first transversely deformed image after each movement and the second transversely deformed image in a vertical direction are calculated, a minimum value in the first difference values is determined, and a first difference value corresponding to the minimum value is recorded as a first target difference value, that is, a smallest difference value is determined from a plurality of difference values, and the smallest difference value is determined as the first target difference value.

Further, after the first target difference value is determined, a total quantity of moved pixels corresponding to the first target difference value is determined, and the total quantity of the pixels is determined as the first motion distance of the first image in the horizontal direction. If one pixel is moved for the first time, a second movement is to move another two pixels based on the first movement, a third movement is to move another four pixels based on the second movement, and the like, X pixels in total are moved, and a first target difference value determined is a difference value between corresponding parts in a vertical direction of the first transversely deformed image after the third movement and the second transversely deformed image, a total quantity of moved pixels corresponding to the first target difference value, that is, a total quantity of moved pixels in the previous three movements, is seven. In this case, the first motion distance of the first image in the horizontal direction is seven pixels.

Further, in a process of determining a second motion distance of the first image in a vertical direction according to a vertical movement distance of the first vertically deformed image relative to the second vertically deformed image, the first vertically deformed image may be moved in sequence in the vertical direction, and after each movement, two sub-images respectively corresponding to the first vertically deformed image after the each movement and the second vertically deformed image in a horizontal direction are determined. A second difference value between the two sub-images is calculated, and a total quantity of moved pixels of the first vertically deformed image after the each movement is determined.

If Y pixels in total are moved, and Y is a positive integer, Y is a total quantity of moved pixels of the first vertically deformed image when that there are no corresponding parts in a horizontal direction between the first vertically deformed image after a movement in the vertical direction and the second vertically deformed image.

The movement in the vertical direction may be a movement downward in the vertical direction, for example, a movement shown in part (3) in FIG. 3a, or may be a movement upward in the vertical direction, and this is not limited in this embodiment of this disclosure. The movement in the vertical direction is described as follows by using a movement upward in the vertical direction as an example.

In one case, if the first vertically deformed image is moved upward in sequence in the vertical direction, and n pixels are moved each time, 1≤n≤X, that is, n pixels are moved upward each time (for example, one pixel is moved for the first time, and a second movement is to move another one pixel based on the first movement, and a third movement is to move another one pixel again based on the second movement), and a sum of pixels moved in all movements is Y, each time the first vertically deformed image is moved, a difference value, that is, the second difference value between two sub-images respectively corresponding to the first vertically deformed image after the movement and the second vertically deformed image in the horizontal direction, is calculated.

Figure 3C:
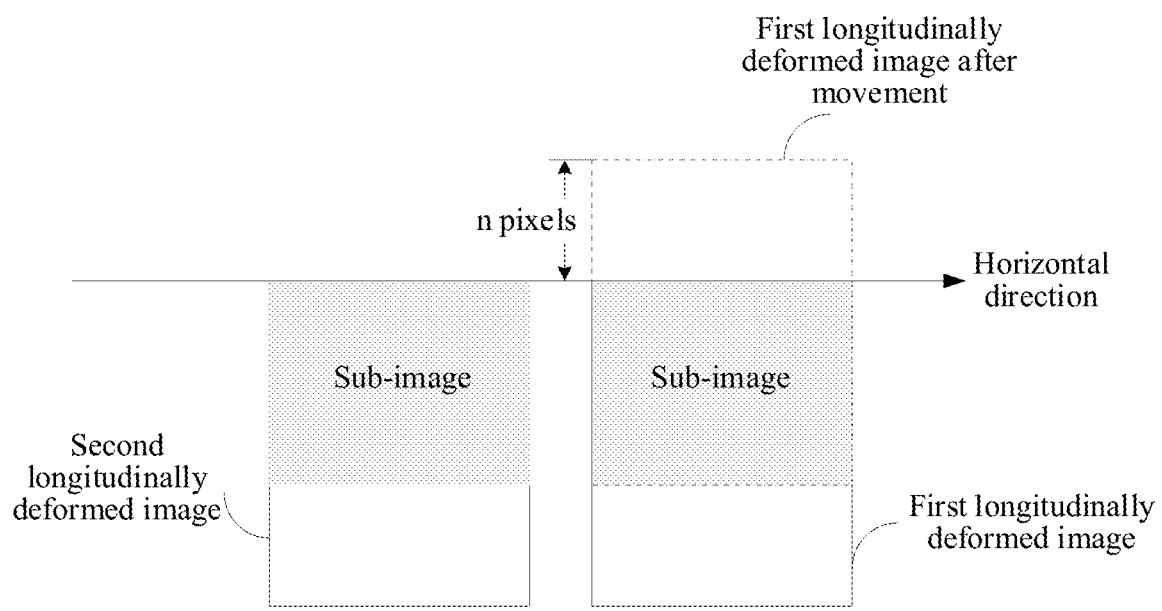
FIG. 3c is a schematic diagram of calculating a second difference value according to an embodiment of this disclosure.

As shown in FIG. 3c, after the first vertically deformed image and the second vertically deformed image are parallel in the vertical direction and aligned at two ends, the first transversely deformed image is moved upward by n pixels to obtain the first vertically deformed image after the movement shown by dashed lines. After the first vertically deformed image after the movement and the second vertically deformed image are aligned in the horizontal direction, two sub-images corresponding to each other (that is, two sub-images that can overlap each other) are obtained.

If R movements in total are performed, R difference values in total are calculated, and a difference value calculated each time is the same or different. In addition, the difference values involved in this paragraph refer to the second difference value.

In another case, if the first vertically deformed image is moved upward relative to the second vertically deformed image in sequence in the vertical direction, and a quantity of pixels moved each time is changed (for example, one pixel moves for the first time, and a second movement is to move another two pixels based on the first movement, and a third movement is to move another four pixels based on the second movement), that is, a quantity of pixels moved each time is dynamically changed, and a sum of pixels moved in all movements is Y, each time the first vertically deformed image is moved, a difference value, that is, a difference value between parts respectively corresponding to the first vertically deformed image after the movement and the second vertically deformed image in the horizontal direction, is calculated. If P movements in total are performed, P difference values in total are calculated, and a difference value calculated each time is the same or different. In addition, the difference values involved in this paragraph refer to the second difference value.

Further, after a plurality of second difference values between corresponding parts of the first vertically deformed image after each movement and the second vertically deformed image in a horizontal direction are calculated, a minimum value among the second difference values is determined, and a second difference value corresponding to the minimum value is recorded as a second target difference value, that is, a smallest difference value is determined from a plurality of difference values, and the smallest difference value is determined as the second target difference value.

Further, after the second target difference value is determined, a total quantity of moved pixels corresponding to the second target difference value is determined, and the total quantity of the pixels is determined as the second motion distance of the first image in the vertical direction. If one pixel is moved for the first time, a second movement is to move another two pixels based on the first movement, a third movement is to move another four pixels based on the second movement, and the like, Y pixels in total are moved, and a second target difference value determined is a difference value between corresponding parts in a horizontal direction of the first vertically deformed image after the third movement and the second vertically deformed image, a total quantity of moved pixels corresponding to the second target difference value, that is, a total quantity of moved pixels in the previous three movements, is seven. In this case, the second motion distance of the first image in the vertical direction is seven pixels.

Further, after the foregoing first motion distance and the second motion distance are obtained, the motion vector is determined according to the first motion distance, the second motion distance, and the preset deformation ratios. In the process of determining the motion vector, both the first motion distance and the second motion distance are calculated according to the deformed first image. Therefore, when the motion vector is calculated, reverse adjustment needs to be performed on the first motion distance and the second motion distance respectively according to a corresponding deformation ratio.

Reverse adjustment for the first motion distance is calculating a first ratio of the first motion distance to the transverse deformation ratio. Reverse adjustment for the second motion distance is calculating a second ratio of the second motion distance to the vertical deformation ratio. The first ratio is the first motion distance obtained after the reverse adjustment according to the transverse deformation ratio, and the second ratio is the second motion distance obtained after the reverse adjustment according to the vertical deformation ratio.

Further, after the first ratio and the second ratio are obtained, the motion vector may be determined according to the first ratio and the second ratio. For example, the motion vector is a sum of a direction vector of the first ratio and a direction vector of the second ratio.

A feasible manner of calculating the motion vector in this implementation is given below.

When the first image is an image A and the second image is an image B, the transverse deformation ratio between the first image and the second image is $r_h^x$, the vertical deformation ratio between the first image and the second image is $r_v^y$, the first transversely deformed image is $A_h^{deform}$ the second transversely deformed image is $B_h^{deform}$, the first vertically deformed image is $A_v^{deform}$, and the second vertically deformed image is $B_v^{deform}$ after the first transversely deformed image is moved left by m points in a horizontal direction, a first difference value $diff_m$ between two sub-images respectively corresponding to the first transversely deformed image and the second transversely deformed image in the vertical direction may be calculated according to the following formula:

$$\{diff_m\} = \varnothing(A_h^{deform}(m:width), B_h^{deform}(0:width-m), m) \quad (3)$$

where width in the foregoing formula represents widths of the first image and the second image after the transverse deformation, $A_h^{deform}$ (m:width) represents a sub-image corresponding to the second transversely deformed image in the vertical direction after the first transversely deformed image is moved left by m points in the horizontal direction, $B_h^{deform}$ (0:width-m) represents a sub-image corresponding to the first transversely deformed image in the vertical direction after the second transversely deformed image is moved left by m points in the horizontal direction. The two sub-images are of the same size, and function ø( ) represents calculating and normalizing a sum of difference values between corresponding pixels of the two sub-images.

Similarly, after the first vertically deformed image is moved upward by n points in the vertical direction, the second difference value $diff_n$ between two sub-images respectively corresponding to the first vertically deformed image and the second vertically deformed image in the horizontal direction may be calculated according to the following formula:

$$\{diff_n\} = \varnothing(A_v^{deform}(n:height), B_v^{deform}(0:height-n), n) \quad (4)$$

where height in the foregoing formula represents heights of the first image and the second image after the vertical deformation, $A_v^{deform}$ (n:height) represents a sub-image corresponding to the second vertically deformed image in the horizontal direction after the first vertically deformed image is moved upward by n points in the vertical direction, $B_v^{deform}$(0:height-n) represents a sub-image corresponding to the first vertically deformed image in the horizontal direction after the second vertically deformed image is moved upward by n points in the vertical direction. The two sub-images are of the same size, and function ø( ) represents calculating and normalizing a sum of difference values between corresponding pixels of the two sub-images.

Figure 4:
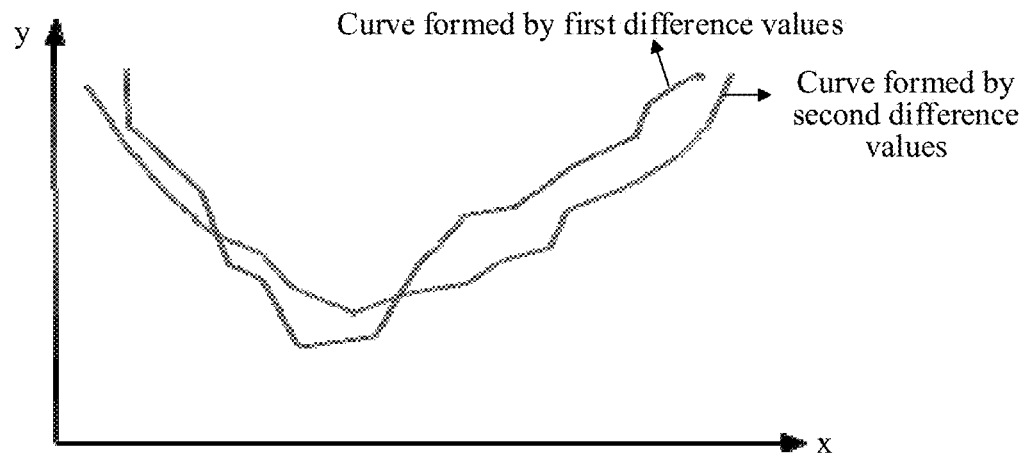
FIG. 4 is a schematic diagram of a difference value curve according to an embodiment of this disclosure.

Further, in a specific situation, the obtained plurality of first difference values may alternatively be separately shown in a rectangular coordinate system, and the plurality of first difference values are connected in a line in sequence to form a curve. A minimum value in the curve is the first target difference value. Similarly, the obtained plurality of second difference values may alternatively be separately shown in a rectangular coordinate system, and the plurality of second difference values are connected in a line in sequence to form a curve. A minimum value in the curve is the second target difference value, as shown in FIG. 4.

Figure 5:
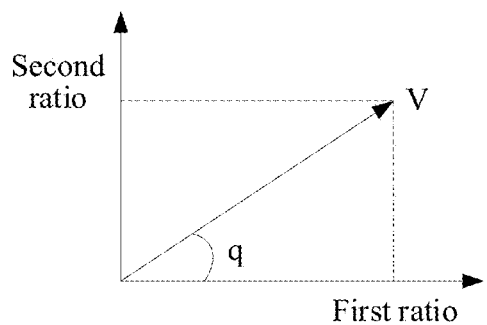
FIG. 5 is a schematic diagram of a motion vector according to an embodiment of this disclosure.

Further, the motion vector of the first image may be calculated by using the following formula:

$$\vec{v} = \overline{(m/r_h^x, 0)} + \overline{(0, n/r_v^y)} \quad (5)$$

where $\vec{v}$ in the foregoing formula represents the motion vector of the first image, $m/r_h^x$ represents the first ratio of the first motion distance to the transverse deformation ratio, and $n/r_v^y$ represents the second ratio of the second motion distance to the vertical deformation ratio. As shown in FIG. 5, a direction indicated by a vector $\vec{v}$ refers to a motion direction of the first image, an angle thereof is recorded as θ, and a length thereof is a motion distance.

In addition, when the first difference value is estimated by using the foregoing Formula (3) and Formula (4), a sum of difference values of two deformed images is calculated, and the sum may represent a relative distance between vectors corresponding to the two sub-images. An operation speed can be improved in this manner in which a difference value is calculated according to a relative distance.

Another possible implementation is provided in this embodiment of this disclosure. When at least one compensated frame between the first image and the second image is determined according to the motion vector, a compensated frame between the first image and the second image may be determined according to the motion vector in any compensation time interval of a preset compensation duration.

Specifically, after the motion vector (including the motion direction and the motion distance) of the first image is obtained, evolutionary compensation may be performed on the first image. A specific compensation policy is as follows. A first preset parameter on any compensation time interval may be determined first; then a first product of the first preset parameter and a vector of the second image is calculated; then a second product of a second preset parameter and a vector of a third image is calculated, the second preset parameter being a difference value between a preset value and the first preset parameter, and the third image being an overlapping portion between the second image and the first image after movement according to the motion vector; and then an image frame on the compensation time interval is determined according to the first product and the second product, and the image frame is rendered, to obtain a compensated frame.

A plurality of compensated frames may be correspondingly obtained on a plurality of compensation time intervals of a preset compensation duration in the foregoing manner, so as to stitch the first image and the second image based on the plurality of compensated frames and further stitch the first to-be-stitched video and the second to-be-stitched video.

Further, a feasible manner of calculating a determined compensated frame in this implementation is given.

$$I_{interpolation} = (\mu - \alpha)\vec{I}_{A+v} + \alpha\vec{I}_B$$

$$\alpha \propto T \quad (6)$$

where α in the foregoing formula is the foregoing first preset parameter, T is a certain compensation time interval, α is proportional to a time parameter T, $\vec{I}_{A+v}$ represents an overlapping portion between the second image and the first image after movement according to the motion vector, $\vec{I}_B$ represents the second image, μ is a preset value and may be set to 1, and $I_{interpolation}$ represents a calculated compensated frame.

In other words, each time a value of T is taken, a value of α is correspondingly taken, so that a corresponding image compensated frame $I_{interpolation}$ may be obtained. There are a plurality of calculated compensated frames, and a quantity of the compensated frames is closely related to a value of the time parameter T.

Figure 6:
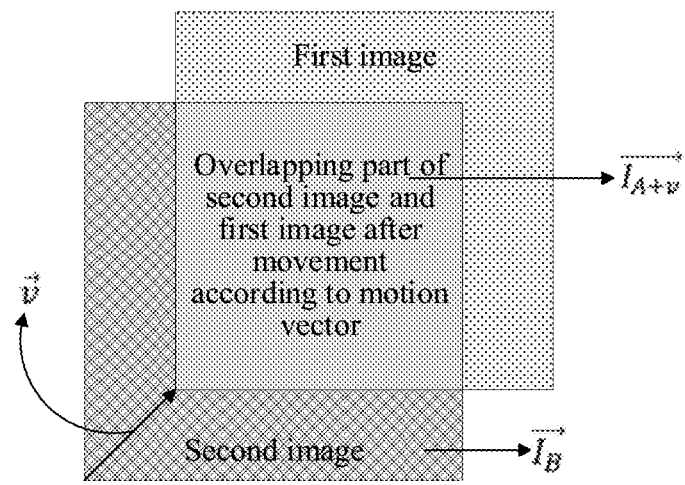
FIG. 6 is a schematic diagram of transitioning a first image to a second image according to an embodiment of this disclosure.

Further, after a plurality of compensated frames are obtained, a graphics processing unit (GPU) of a terminal device may be used for rendering the obtained at least one compensated frame, and the first image is transitioned to the second image. That is, a fusion of the second image and the first image after the movement is implemented as shown in FIG. 6. In addition, the methods in this step does not require global information. Therefore, the methods may be concurrently performed in terms of an algorithm, and the methods may all be combined with rendering on a mobile device, so as to implement real-time rendering and coding.

The method provided in this embodiment of this disclosure may take advantage of the GPU rendering and synthesis on a mobile device to perform smooth compensation for a jitter between two videos, so that the two videos can be smoothly transitioned. Different from an ordinary template-based transition effect, the method according to this embodiment is more adaptable, and at the same time, the GPU is used for accelerating the algorithm, and jitter compensation is real-time, thereby having a small impact on users and being capable of guaranteeing use experience of the users to a maximum degree.

In addition, the method provided in this embodiment of this disclosure is applicable to a mobile device, is designed to provide a high speed and accurate compensation, and makes use of a GPU on the mobile device to accelerate an algorithm. (1) In terms of performance, an algorithm that can be concurrently performed is selected and used, so that a calculation speed is accelerated, and an effect of a real-time stitching is achieved in combination with GPU rendering. (2) In terms of accuracy, optimized customization is performed on non-linearly captured video stitching, thereby reducing an image jitter after a plurality of videos are stitched, and providing better video stitching and publishing experience. (3) In terms of applicability, the method is applicable to an Android mobile device and an IOS (Apple) mobile device, thereby being capable of covering most of users.

Figure 7:
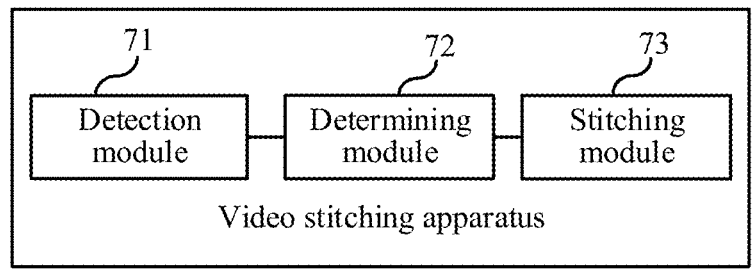
FIG. 7 is a schematic diagram of a basic structure of a video stitching apparatus according to an embodiment of this disclosure.

Yet another embodiment of this disclosure provides a video stitching apparatus. FIG. 7 is a schematic structural diagram of the video stitching apparatus. The apparatus 70 may include a detection module 71, a determining module 72, and a stitching module 73, where the detection module 71 is configured to detect a similarity between a first image and a second image, the first image being a last image frame of a first to-be-stitched video, and the second image being a first image frame of a second to-be-stitched video;

the determining module 72 is configured to determine a motion vector of the first image relative to the second image when the similarity meets a preset condition; and the stitching module 73 is configured to determine at least one compensated frame between the first image and the second image according to the motion vector, and stitch the first image and the second image based on the at least one compensated frame to stitch the first to-be-stitched video and the second to-be-stitched video.

Figure 8:
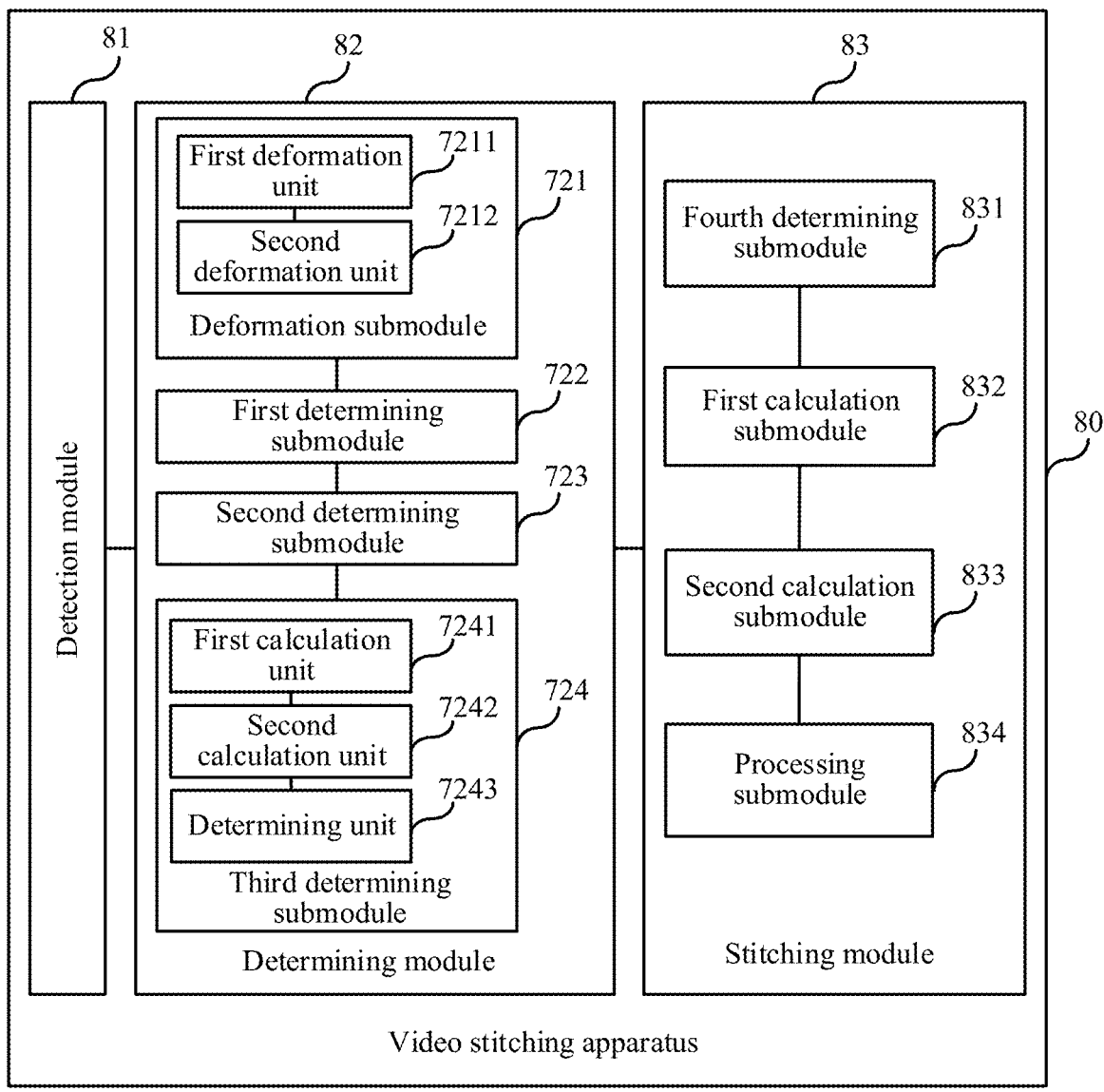
FIG. 8 is a detailed schematic structural diagram of a video stitching apparatus according to another embodiment of this disclosure.

Specifically, FIG. 8 is a detailed schematic structural diagram of a video stitching apparatus according to yet another embodiment of this disclosure. The apparatus 80 may include a detection module 81, a determining module 82, and a stitching module 83. A function implemented by the detection module 81 in FIG. 8 is the same as that implemented by the detection module 71 in FIG. 7, a function implemented by the determining module 82 in FIG. 8 is the same as that implemented by the determining module 72 in FIG. 7, and a function implemented by the stitching module 83 in FIG. 8 is the same as that implemented by the stitching module 73 in FIG. 7. Details are not described herein again. The video stitching apparatus shown in FIG. 8 is described in detail in the following.

That a similarity meets a preset condition includes: the similarity is not less than a preset similarity threshold.

In an implementation, the detection module 81 is specifically configured to determine a first grayscale histogram of the first image and a second grayscale histogram of the second image, determine a weight of each grayscale in the first grayscale histogram, and determine a similarity between the first image and the second image according to the determined weights, a quantity of pixels corresponding to each grayscale in the first grayscale histogram, and a quantity of pixels corresponding to each grayscale in the second grayscale histogram.

In another implementation, the determining module 82 includes a deformation submodule 721, a first determining submodule 722, a second determining submodule 723, and a third determining submodule 724.

The deformation submodule 821 is configured to perform a transverse deformation and a vertical deformation on the first image and the second image based on preset deformation ratios.

The first determining submodule 822 is configured to determine a first motion distance of the first image in a horizontal direction according to a horizontal movement distance of the first transversely deformed image relative to the second transversely deformed image.

The second determining submodule 823 is configured to determine a second motion distance of the first image in a vertical direction according to a vertical movement distance of the first vertically deformed image relative to the second vertically deformed image.

The third determining submodule 824 is configured to determine the motion vector according to the first motion distance, the second motion distance, and the preset deformation ratios.

In another implementation, the preset deformation ratios include a transverse deformation ratio and a vertical deformation ratio, and the deformation submodule 721 includes a first deformation unit 7211 and a second deformation unit 7212, where the first deformation unit 7211 is configured to perform the transverse deformation on the first image and the second image separately according to the transverse deformation ratio to correspondingly obtain a first transversely deformed image and a second transversely deformed image; and the second deformation unit 7212 is configured to perform the vertical deformation on the first image and the second image separately according to the vertical deformation ratio to correspondingly obtain a first vertically deformed image and a second vertically deformed image.

In another implementation, the first deformation unit 7211 is specifically configured to set the first transversely deformed image and the second transversely deformed image as parallel in the horizontal direction and aligned at two ends; move the first transversely deformed image in the horizontal direction in sequence, and determine, after each movement, two sub-images respectively corresponding to the first transversely deformed image after the each movement and the second transversely deformed image in the vertical direction, calculate a first difference value between the two sub-images, and determine a total quantity of moved pixels of the first transversely deformed image after the each movement; determine a minimum value in the first difference values and record a first difference value corresponding to the minimum value as a first target difference value; and determine a total quantity of moved pixels corresponding to the first target difference value as the first motion distance of the first image in the horizontal direction.

In another implementation, the second deformation unit 7212 is specifically configured to set the first vertically deformed image and the second vertically deformed image as parallel in the vertical direction and aligned at two ends; move the first vertically deformed image in the vertical direction in sequence, and determine, after each movement, two sub-images respectively corresponding to the first vertically deformed image after the each movement and the second vertically deformed image in the horizontal direction, calculate a second difference value between the two sub-images, and determine a total quantity of moved pixels of the first vertically deformed image after the each movement; determine a minimum value among the second difference values and record a second difference value corresponding to the minimum value as a second target difference value; and determine a total quantity of moved pixels corresponding to the second target difference value as the second motion distance of the first image in the vertical direction.

In another implementation, the third determining submodule 724 includes a first calculation unit 7241, a second calculation unit 7242, and a determining unit 7243.

The first calculation unit 7241 is configured to calculate a first ratio of the first motion distance to the transverse deformation ratio.

The second calculation unit 7242 is configured to calculate a second ratio of the second motion distance to the vertical deformation ratio.

The determining unit 7243 is configured to determine a motion vector according to the first ratio and the second ratio.

In another implementation, the stitching module 83 includes a fourth determining submodule 831, a first calculation submodule 832, a second calculation submodule 833, and a processing submodule 834.

The fourth determining submodule 831 is configured to determine a first preset parameter in any compensation time interval.

The first calculation submodule 832 is configured to calculate a first product of the first preset parameter and a vector of the second image.

The second calculation submodule 833 is configured to calculate a second product of a second preset parameter and a vector of a third image, the third image being an overlapping portion between the second image and the first image after movement according to the motion vector.

The processing submodule 834 is configured to determine an image frame in the compensation time interval according to the first product and the second product, and rendering the image frame to obtain the compensated frame.

In another implementation, the stitching module 83 is configured to render the at least one compensated frame, and transition the first image to the second image.

Compared with the conventional technology, the apparatus provided in this embodiment of this disclosure, by determining, for a first image and a second image between which a similarity meets a preset similarity condition, a motion vector of the first image relative to the second image, determining at least one compensated frame between the first image and the second image according to the motion vector, and stitching the first image and the second image based on the at least one compensated frame, provides a method for stitching non-linearly captured video clips on a mobile device. By means of the method, a plurality of videos can be efficiently stitched on the mobile device in real time, and smooth compensation of high quality is performed on a jitter at a connection part of the videos, so that a smooth transition may be achieved between the plurality of videos, videos uploaded by a user are ensured to be smoother, and cases such as an image jitter or image jump after the plurality of videos are stitched are effectively reduced, thereby greatly improving the user' experience in video stitching, publishing, and viewing. Besides, the method can be applicable to a terminal device with an operating system such as Android or IOS without a support of specific hardware in the terminal device, thereby avoiding a dependence on hardware manufacturers and resolving the problem of a limitation on mobile devices and use scenarios in an ordinary video frame interpolation method.

Figure 9:
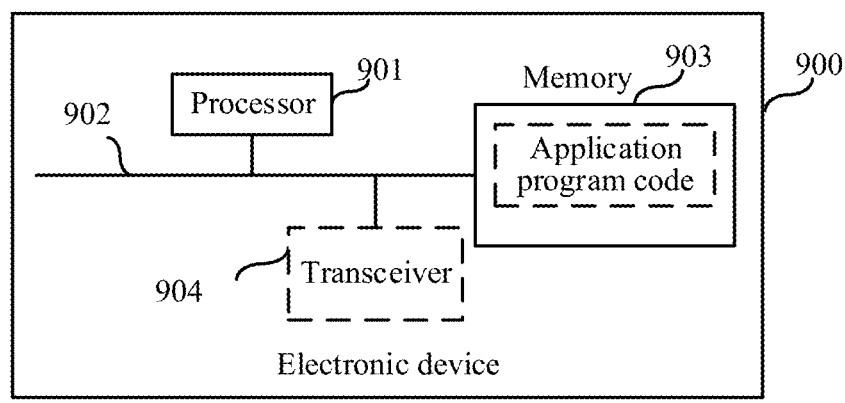
FIG. 9 is a schematic structural diagram of an electronic device according to an embodiment of this disclosure.

As shown in FIG. 9, another embodiment of this disclosure provides an electronic device. An electronic device 900 shown in FIG. 9 includes a processor 901 and a memory 903. The processor 901 and the memory 903 are connected, for example, are connected by using a bus 902. Further, the electronic device 900 may further include a transceiver 904. In an actual application, there may be one or more transceivers 904. The structure of the electronic device 900 does not constitute a limitation on this embodiment of this disclosure.

The processor 901 is applied to this embodiment of this disclosure, to implement functions of the detection module, the determining module, and the stitching module shown in FIG. 7 or FIG. 8. The term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform predefined functions and achieve predefined goals such as those described in this disclosure, and may work together with other related modules, programs, and components to achieve those predefined functions and goals.

The processor 901 may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processor 901 may implement or perform various examples of logic blocks, modules, and circuits described with reference to content disclosed in this application. The processor 901 may alternatively be a combination to implement a computing function, for example, may be a combination of one or more microprocessors, or a combination of a DSP and a microprocessor.

The bus 902 may include a channel, to transmit information between the foregoing components. The bus 902 may be a PCI bus, an EISA bus, or the like. The bus 902 may be classified into an address bus, a data bus, a control bus, and the like. For ease of description, the bus in FIG. 9 is represented by using only one bold line, but this does not indicate that there is only one bus or one type of bus.

The memory 903 may be a ROM or another type of static storage device that can store static information and a static instruction; or a RAM or another type of dynamic storage device that can store information and an instruction; or may be an EEPROM, a CD-ROM or another compact-disc storage medium, optical disc storage medium (including a compact disc, a laser disk, an optical disc, a digital versatile disc, a Blu-ray disc, or the like) and magnetic disk storage medium, another magnetic storage device, or any other medium that can be configured to carry or store expected program code in a form of an instruction or a data structure and that is accessible by a computer, but is not limited thereto.

The memory 903 is configured to store application program codes for performing the solutions of this application, and is controlled and executed by the processor 901. The processor 901 is configured to execute application program codes stored in the memory 903 to implement actions of the video stitching apparatus provided in the embodiment shown in FIG. 7 or FIG. 8.

The electronic device provided in this embodiment of this disclosure includes a memory, a processor, and a computer program stored in the memory and executable on the processor. Compared with the conventional technology, the processor, when executing the program, can implement the following function: by determining, for a first image and a second image between which a similarity meets a preset condition, a motion vector of the first image relative to the second image, determining at least one compensated frame between the first image and the second image according to the motion vector, and stitching the first image and the second image based on the at least one compensated frame, a method for stitching non-linearly captured video clips on a mobile device is provided. By means of the method, a plurality of videos can be efficiently stitched on the mobile device in real time, and smooth compensation of high quality is performed on a jitter at a connection part of the videos, so that a smooth transition may be achieved between the plurality of videos, videos uploaded by a user are ensured to be smoother, and cases such as an image jitter or image jump after the plurality of videos are stitched are effectively reduced, thereby greatly improving the user' experience in video stitching, publishing, and viewing. Besides, the method can be applicable to a terminal device with an operating system such as Android or IOS without a support of specific hardware in the terminal device, thereby avoiding a dependence on hardware manufacturers and resolving the problem of a limitation on mobile devices and use scenarios in an ordinary video frame interpolation method.

An embodiment of this disclosure provides a non-transitory computer-readable storage medium, storing a computer program, the program, when executed by a processor, implementing the method according to the embodiments of this application. Compared with the conventional technology, by determining, for a first image and a second image between which a similarity meets a preset condition, a motion vector of the first image relative to the second image, determining at least one compensated frame between the first image and the second image according to the motion vector, and stitching the first image and the second image based on the at least one compensated frame, a method for stitching non-linearly captured video clips on a mobile device is provided. By means of the method, a plurality of videos can be efficiently stitched on the mobile device in real time, and smooth compensation of high quality is performed on a jitter at a connection part of the videos, so that a smooth transition may be achieved between the plurality of videos, videos uploaded by a user are ensured to be smoother, and cases such as an image jitter or image jump after the plurality of videos are stitched are effectively reduced, thereby greatly improving the user' experience in video stitching, publishing, and viewing. Besides, the method can be applicable to a terminal device with an operating system such as Android or IOS without a support of specific hardware in the terminal device, thereby avoiding a dependence on hardware manufacturers and resolving the problem of a limitation on mobile devices and use scenarios in an ordinary video frame interpolation method.

The computer-readable storage medium provided in this embodiment of this disclosure is applicable to any one embodiment of the foregoing method. Details are not described herein again.

It is to be understood that, although the steps in the flowchart in the accompanying drawings are sequentially shown according to indication of an arrow, the steps are not necessarily sequentially performed according to a sequence indicated by the arrow. Unless explicitly specified in this specification, execution of the steps is not strictly limited in the sequence, and the steps may be performed in other sequences. In addition, at least some steps in the flowcharts in the accompanying drawings may include a plurality of sub steps or a plurality of stages. The substeps or the stages are not necessarily performed at the same moment, but may be performed at different moments. The substeps or the stages are not necessarily performed in sequence, but may be performed in turn or alternately with another step or at least some of substeps or stages of the another step.

The foregoing descriptions are some implementations of this application. A person of ordinary skill in the art may make several improvements and refinements without departing from the principle of this application, and the improvements and refinements shall fall within the protection scope of this application.

What is claimed is:

1. A video stitching method, performed by an electronic device, comprising:
   detecting a similarity between a first image and a second image, the first image being an image frame of a first to-be-stitched video, and the second image being an image frame of a second to-be-stitched video;
   determining a motion vector of the first image relative to the second image when the similarity meets a preset condition;
   determining at least one compensated frame between the first image and the second image according to the motion vector; and
   stitching the first image and the second image based on the at least one compensated frame to stitch the first to-be-stitched video and the second to-be-stitched video.

2. The method according to claim 1, wherein detecting the similarity between the first image and the second image comprises:
   determining a first grayscale histogram of the first image and a second grayscale histogram of the second image;
   determining weights of grayscales in the first grayscale histogram and the second grayscale histogram; and
   determining the similarity between the first image and the second image according to the weights of the grayscales, a distribution of pixels of the first image among the grayscales in the first grayscale histogram, and distribution of pixels of the second image among the grayscales in the second grayscale histogram.

3. The method according to claim 2, wherein determining the weights of the grayscales in the first grayscale histogram comprises:
   using, for a specific grayscale of the grayscales, a ratio of a quantity of the pixels of the first image corresponding to the specific grayscale to a total quantity of pixels as the weight of the specific grayscale.

4. The method according to claim 1, wherein determining the motion vector of the first image relative to the second image comprises:
   performing a transverse deformation and a vertical deformation on the first image and the second image based on preset deformation ratios to obtain a first transversely deformed image, a second transversely deformed image, a first vertically deformed image, and a second vertically deformed image;
   determining a first motion distance of the first image in a horizontal direction according to a horizontal movement distance of the first transversely deformed image relative to the second transversely deformed image;
   determining a second motion distance of the first image in a vertical direction according to a vertical movement distance of the first vertically deformed image relative to the second vertically deformed image; and
   determining the motion vector according to the first motion distance, the second motion distance, and the preset deformation ratios.

5. The method according to claim 4, wherein the preset deformation ratios comprise a transverse deformation ratio and a vertical deformation ratio and wherein performing the transverse deformation and the vertical deformation on the first image and the second image based on preset deformation ratios comprises:
   performing the transverse deformation on the first image and the second image separately according to the transverse deformation ratio to correspondingly obtain the first transversely deformed image and the second transversely deformed image; and
   performing the vertical deformation on the first image and the second image separately according to the vertical deformation ratio to correspondingly obtain the first vertically deformed image and the second vertically deformed image.

6. The method according to claim 5, wherein determining the first motion distance of the first image in the horizontal direction according to the horizontal movement distance of the first transversely deformed image relative to the second transversely deformed image comprises:
   setting the first transversely deformed image and the second transversely deformed image as parallel in the horizontal direction and aligned at two ends;
   moving the first transversely deformed image in the horizontal direction in a sequence of movements, and determining, after each of the sequence of movements, two sub-images respectively corresponding to the first transversely deformed image and the second transversely deformed image in the vertical direction, calculating first difference values between the two sub-images, and determining a total quantity of moved pixels of the first transversely deformed image after the sequence of movements;
   determining a minimum first difference value among the first difference values as a first target difference value; and
   determining a total quantity of moved pixels corresponding to the first target difference value as the first motion distance of the first image in the horizontal direction.

7. The method according to claim 5, wherein determining the second motion distance of the first image in the vertical direction according to the vertical movement distance of the first vertically deformed image relative to the second vertically deformed image comprises:
   setting the first vertically deformed image and the second vertically deformed image as parallel in the vertical direction and aligned at two ends;
   moving the first vertically deformed image in the vertical direction in sequence of movements, and determining, after each of the sequence of movements, two sub-images respectively corresponding to the first vertically deformed image and the second vertically deformed image in the horizontal direction, calculating second difference values between the two sub-images, and determining a total quantity of moved pixels of the first vertically deformed image after the sequence of movements;
   determining a minimum second difference value among the second difference values as a second target difference value; and
   determining a total quantity of moved pixels corresponding to the second target difference value as the second motion distance of the first image in the vertical direction.

8. The method according to claim 4, wherein the preset deformation ratios comprise a transverse deformation ratio and a vertical deformation ratio, and wherein determining the motion vector according to the first motion distance, the second motion distance, and the preset deformation ratios comprises:
   calculating a first ratio of the first motion distance to the transverse deformation ratio;
   calculating a second ratio of the second motion distance to the vertical deformation ratio; and
   determining the motion vector according to the first ratio and the second ratio.

9. The method according to claim 1, wherein determining the at least one compensated frame between the first image and the second image according to the motion vector comprises:
   determining a first preset parameter in a compensation time interval;
   calculating a first product of the first preset parameter and a vector of the second image;
   calculating a second product of a second preset parameter and a vector of a third image, the third image being an overlapping portion between the second image and the first image after at least one movement according to the motion vector; and
   determining an image frame in the compensation time interval according to the first product and the second product, and rendering the image frame to obtain the compensated frame.

10. The method according to claim 1, wherein stitching the first image and the second image based on the at least one compensated frame comprises:
   rendering the at least one compensated frame, and transitioning the first image to the second image.

11. The method according to claim 1, wherein the first image is the last image frame of the first to-be-stitched video, and the second image is the first image frame of the second to-be-stitched video.

12. The method according to claim 1, wherein detecting a similarity between a first image and a second image comprises:
   detecting the similarity based on a first grayscale distribution of the first image in a first grayscale histogram and a second grayscale distribution of the second image in a second grayscale histogram.

13. The method according to claim 1, wherein determining the motion vector of the first image relative to the second image comprises:
   determining the motion vector according to a horizontal movement distance of a first transversely deformed image of the first image relative to a second transversely deformed image of the second image and according to a vertical movement distance of a first vertically deformed image of the first image relative to a second vertically deformed image of the second image.

14. The method according to claim 13, wherein determining the motion vector according to the horizontal movement distance of the first transversely deformed image of the first image relative to the second transversely deformed image of the second image and according to the vertical movement distance of the first vertically deformed image of the first image relative to the second vertically deformed image of the second image comprises:
   determining the motion vector according to a first ratio and a second ratio, the first ratio being a ratio of the horizontal movement distance to a transverse deformation ratio of the first transversely deformed image, the second ratio being a ratio of the vertical movement distance to a vertical deformation ratio of the first vertical deformed image.

15. The method according to claim 14, wherein determining the motion vector according to the first ratio and the second ratio comprises:
   determining the motion vector based on a sum of a directional vector of the first ratio and a directional vector of the second ratio.

16. The method according to claim 1, wherein stitching the first image and the second image based on the at least one compensated frame to stitch the first to-be-stitched video and the second to-be-stitched video comprises:
   compensating a jitter between the first to-be-stitched video and the second to-be-stitched video by the at least one compensated frame.

17. The method according to claim 1, wherein the at least one compensated frame comprises a plurality of compensated frames for a plurality of time intervals.

18. The method according to claim 1, wherein determining the at least one compensated frame between the first image and the second image according to the motion vector comprises:
  determining the at least one compensated frame according to a interpolation time, the second image and an overlapping portion between the second image and the first image after a movement according to the motion vector.

19. An electronic device, comprising a memory, a processor, and a computer program stored on the memory and executable on the processor, the processor, when executing the program, implementing a video stitching method, the method comprising:
  detecting a similarity between a first image and a second image, the first image being an image frame of a first to-be-stitched video, and the second image being an image frame of a second to-be-stitched video;
  determining a motion vector of the first image relative to the second image when the similarity meets a preset condition;
  determining at least one compensated frame between the first image and the second image according to the motion vector; and
  stitching the first image and the second image based on the at least one compensated frame to stitch the first to-be-stitched video and the second to-be-stitched video.

20. A non-transitory computer-readable storage medium, storing a computer program, the program, when executed by a processor, implementing the video stitching method, the method comprising:
  detecting a similarity between a first image and a second image, the first image being an image frame of a first to-be-stitched video, and the second image being an image frame of a second to-be-stitched video;
  determining a motion vector of the first image relative to the second image when the similarity meets a preset condition;
  determining at least one compensated frame between the first image and the second image according to the motion vector; and
  stitching the first image and the second image based on the at least one compensated frame to stitch the first to-be-stitched video and the second to-be-stitched video.

* * * * *